350-166

SEARCH ROOM

March 16, 1954 L. T. SACHTLEBEN ET AL 2,672,072

COLOR TELEVISION OPTICAL SYSTEM

Filed March 15, 1951 3 Sheets-Sheet 1

INVENTORS
LAWRENCE T. SACHTLEBEN
& GLENN L. DIMMICK
BY
ATTORNEY

INVENTORS
LAWRENCE T. SACHTLEBEN
& GLENN L. DIMMICK
BY [signature]
ATTORNEY

March 16, 1954 L. T. SACHTLEBEN ET AL 2,672,072

COLOR TELEVISION OPTICAL SYSTEM

Filed March 15, 1951 3 Sheets-Sheet 3

INVENTORS
LAWRENCE T. SACHTLEBEN
& GLENN L. DIMMICK
BY [signature]
ATTORNEY

Patented Mar. 16, 1954 2,672,072

UNITED STATES PATENT OFFICE 2,672,072

COLOR TELEVISION OPTICAL SYSTEM

Lawrence T. Sachtleben, Haddonfield, and Glenn L. Dimmick, Haddon Heights, N. J., assignors to Radio Corporation of America, a corporation of Delaware Application March 15, 1951, Serial No. 215,722

6 Claims. (Cl. 88—1)

Figure 1:
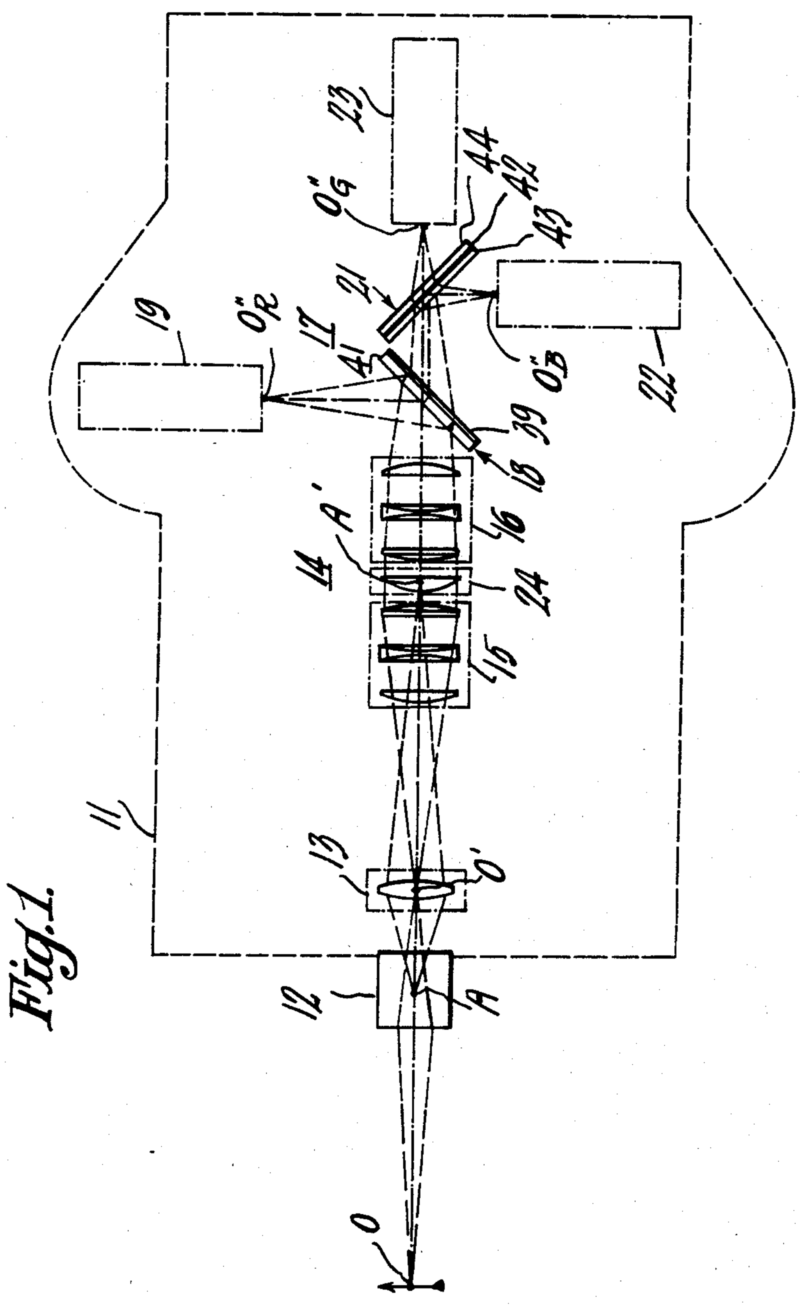

This invention relates to optical systems and particularly to the optical apparatus employed in color television cameras.

The present invention pertains to an optical system for transferring light between an object plane and a plurality of separate image planes. A specific embodiment of the invention is in a color television system in which signals representing a plurality of the component image colors are to be developed simultaneously or substantially so. It is customary, in such systems, to provide a signal-generating tube for each of the component image colors. An example of a truly simultaneous color television system, employing a signalling channel for each of the color representative video signal trains, is shown in U. S. Patent 2,335,180 granted November 23, 1943, to Alfred N. Goldsmith and titled "Television System." An example of a substantially simultaneous color television system, employing a single signalling channel, is described in an article titled "A Six-Megacycle Compatible High-Definition Color Television System" by RCA Laboratories Division, published in the RCA Review, vol. X, No. 4, December 1949, p. 504. Such a system also is the subject matter of a copending U. S. application of John Evans, Serial No. 111,384 filed August 20, 1949, and titled "Color Television." In this type of system, the different color representative video signal trains are multiplexed on a time division basis and transmitted over the single communication channel.

In order to direct light of the different component colors to the respective signal-generating tubes, it is necessary to employ apparatus by which to separate the light into its component colors. A particularly efficient device of this character is an arrangement of dichroic reflectors. Representative examples of color-selective apparatus of this character are shown in U. S patents to Glenn L. Dimmick 2,379,790 granted July 3, 1945, and titled "Dichroic Reflectors" and 2,412,496 granted December 10, 1946, and titled "Color Selective Reflector."

In providing a color television camera, it also is desirable to use a maximum of the standard or conventional equipment usually employed in television cameras. In the present case, it is convenient to employ the normal complement of turret mounted objective lenses of a standard black and white television camera. Many of the lenses on the turret of a standard television camera are of relatively short focal length or for other reasons they may have relatively short working distances between the lens, or its mounting, or the turret, and the plane of the image formed thereby. In the standard television camera, the plane of this image includes the photosensitive electrode of the signal-generating tube. When a light separator of the dichroic reflector type is to be used, there is not enough space in which to mount it between the standard objective lens and its image plane. Accordingly, it is seen that if the standard objective lenses normally provided with a television camera are to be used, it is necessary that an additional optical system be provided.

Furthermore, the dichroic reflectors are of such a character that inherently there is introduced into the optical system astigmatism of such a magnitude that it is intolerable for use in high quality systems. The magnitude of the astigmatism produced by the dichroic reflectors may be different for the different image colors, but it can be equalized or normalized so that it is the same for all colors. One way of accomplishing this normalization is by the employment of dichroic reflectors of the particular type shown in a copending U. S. application of J. E. Albright, Serial No. 191,068, filed October 19, 1950, and titled "Color Selective Optical System." However, the astigmatism affecting all of the component color images is of such a magnitude that further correction is required.

Therefore, it is an object of the present invention to provide an improved light separating optical system for transferring light between an object plane and a plurality of separate image planes.

Another object of the invention is to provide an improved optical system for transferring light between an object plane and a plurality of image planes and which is substantially free of astigmatism.

Still another object of the invention is to provide an improved optical system for transferring light between an object plane and a plurality of component color image planes and in which the color-selective apparatus is compensated for astigmatism.

An additional object of the present invention is to provide an improved color television camera for use in a substantially simultaneous type television system.

Another object of the invention is to provide an improved color television camera for use in a substantially simultaneous type color television system in which standard objective lenses of relatively short focal lengths or short working distances are employed.

A further object of the invention is to provide an improved optical system for color television cameras in which the image-representative light is selectively separated into its component colors by a dichroic reflector system which is compensated for astigmatism.

In accordance with the present invention, the optical system comprises light separating apparatus which includes a plane transparent member mounted between an object plane and the region of a plurality of separate image planes at an oblique angle to an axis through the object plane. Also, the system embodying the invention includes image relaying apparatus and/or an astigmatism corrector located between the object plane and the light separating apparatus.

In accordance with a specific embodiment of the present invention, a color television camera is provided and comprises a signal-generating tube for each of the component image colors. The component colors are selectively directed to the respective tubes by means of a dichroic reflector system located between the tube and the objective lens of the camera. In order to permit the use of objective lenses of relatively short focal lengths, there also is provided, in the optical path between the dichroic reflector and the objective lens, an image-relaying apparatus and a field lens located between the objective lens and the relay system. The astigmatism for the different component image colors is normalized as previously indicated by use of dichroic reflectors of the type shown in the copending Albright application referred to. In general, they are of a character to require the light of all of the colors to travel equal distances through the transparent supporting structure of the reflectors as well as equal distances in air.

Furthermore, in accordance with another feature of the invention the astigmatism produced by the dichroic reflectors for all of the colors is corrected by the introduction of a cylindrical lens at a point in the optical path between the objective lens and the dichroic reflector apparatus. In a preferred form of the invention, the cylindrical lens may be mounted substantially at the mid point of the image-relaying apparatus.

In another form of the invention, the general astigmatic correction is effected by a plurality of transparent plates similar to the supports for the dichroic reflectors and arranged relative to one another in a manner similar to the dichroic reflectors but having an orientation of 90° relative to the dichroic reflectors.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figures 2, 2A, 3:
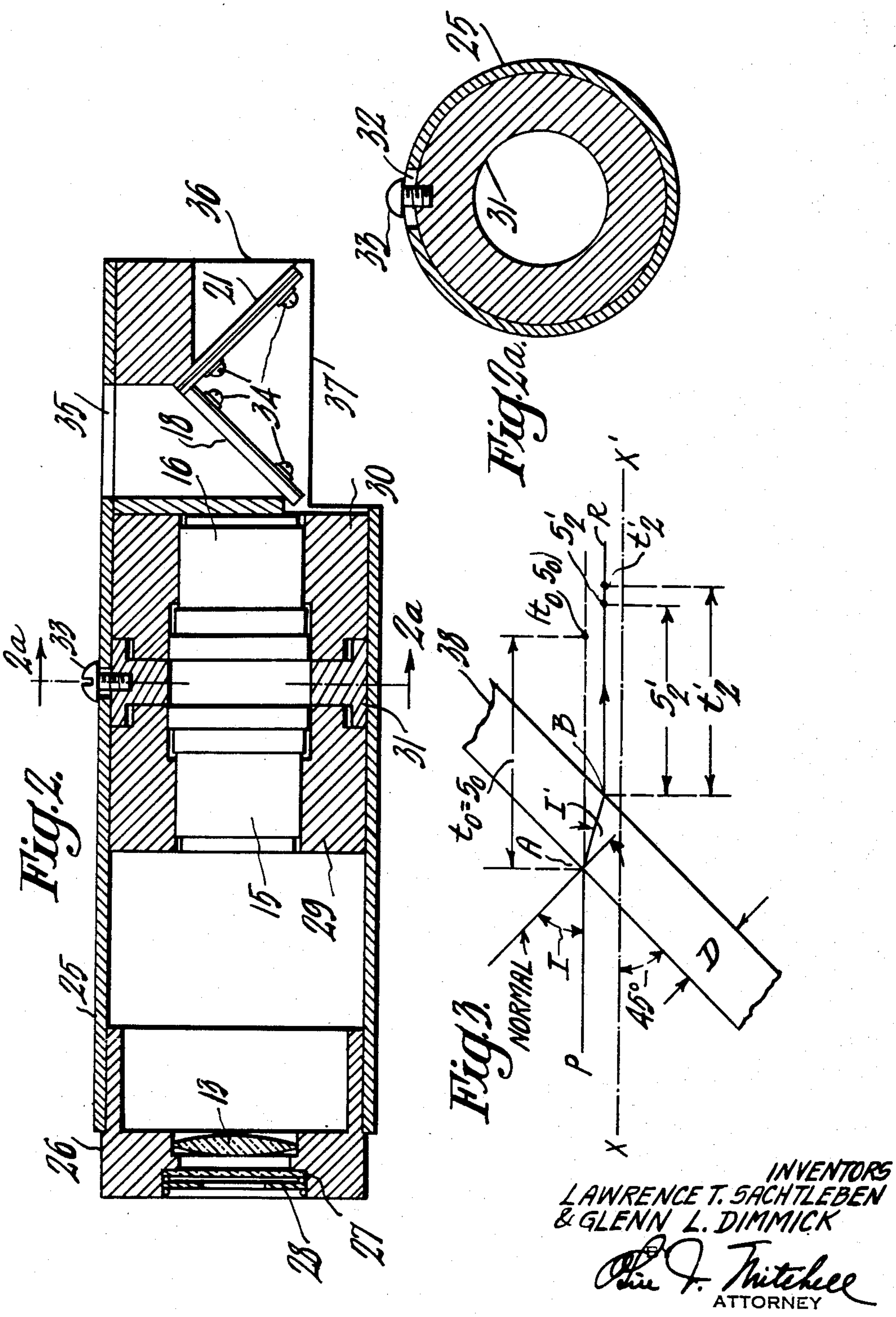
Figure 4:
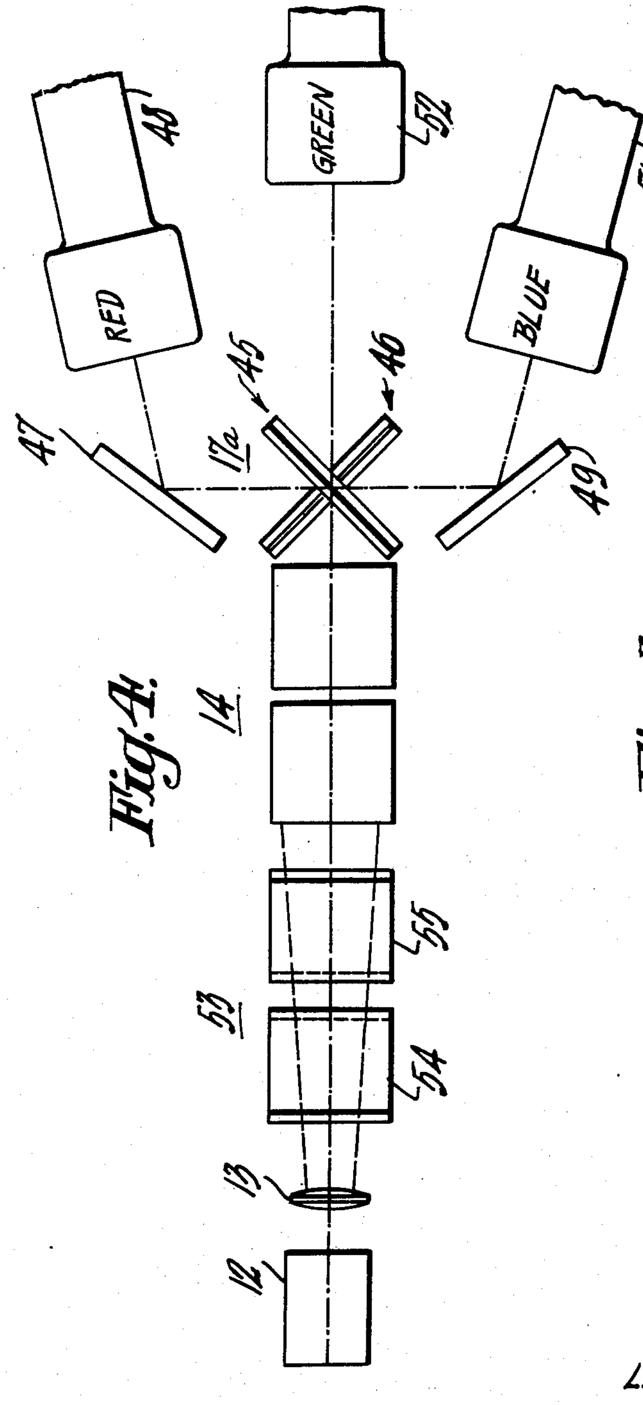
Figure 4A:
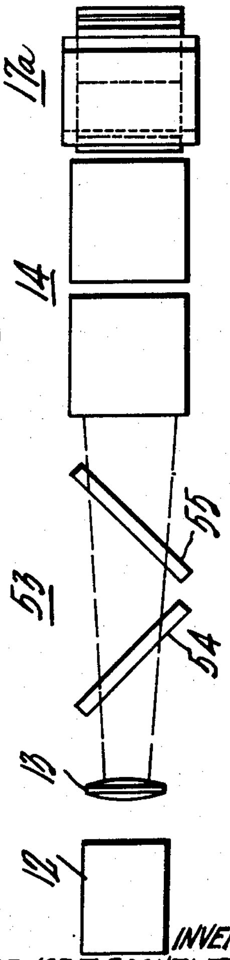

In the drawings:

Figure 1 is a diagrammatic representation of a color television camera embodying an optical system in accordance with the present invention;

Figures 2 and 2*a* are longitudinal and transverse sections respectively of one embodiment of an optical system in accordance with this invention;

Figure 3 is a diagrammatic illustration of the manner in which the dichroic reflectors introduce astigmatism in a system of a character in which the present invention is embodied, and;

Figures 4 and 4*a* are diagrammatic illustrations of plan and elevational views respectively of another embodiment of the invention in a color television camera.

Reference first will be made to Figure 1 of the drawings for a general description of an embodiment of the present invention in a color television camera. The camera is contained in a suitable housing, the outline of which is indicated by the broken line 11. At the front end of the camera housing there is mounted the usual objective lens 12 having a relatively short focal length or back working distance. It will be understood that this lens may be one of several mounted on a turret attached to the front end of the camera housing if desired.

Within the camera housing 11 there is mounted a field lens 13 adjacent to the objective lens 12. At a predetermined distance in back of the field lens, there is mounted an image-relaying apparatus 14. This apparatus can be formed of two relatively long focal length objective lenses 15 and 16. Each of these lenses is mounted on the normally infinity conjugate side of the other. By means of this arrangement a unit magnification is effected. Greater or smaller than unit magnification may be effected by the relaying apparatus, if desired, without departing from the invention.

The optical system also includes color selective apparatus 17 located on the side of the image-relaying apparatus 14 which is remote from the objective lens 12. In accordance with this invention, the color selective apparatus consists essentially of a plurality of dichroic reflectors. In case of a three-color television system, two of such reflectors are used. The dichroic reflector 18, it will be assumed, is of a character to reflect red light and to transmit green and blue light. Accordingly, it is mounted at a substantially 45° angle to the axis of the optical system so that red light is reflected upwardly as viewed in the drawing onto a red video signal-generating tube 19. The dichroic reflector 21 also is mounted at a substantially 45° angle with respect to the axis of the system but in a reverse sense to the reflector 18. It is of a character to reflect blue light downwardly, as viewed in the drawing, to a blue video signal-generating tube 22. The reflector 21 is of such a character that the green light is transmitted to a green video signal-generating tube 23 mounted substantially on the axis of the system. The signal-generating tubes 19, 22 and 23 may be the relatively small photoconductive type of tubes known as the vidicon. An example of such a tube is disclosed in an article titled "The Vidicon Photoconductive Camera Tube" by Paul K. Weimer, Stanley V. Forgue and Robert R. Goodrich appearing at pages 70–73 of Electronics, May, 1950.

As indicated previously, the dichroic reflectors 18 and 21 preferably are made in accordance with the teachings of the copending Albright application referred to. In this way, the individual astigmatism of the light which is reflected and transmitted respectively by each of these devices is normalized or made equal for light of all colors. However, by reason of the angular relationship of the dichroic reflectors 18 and 21 to the axis of the system, a common astigmatism is produced in the light of all three colors. This common astigmatism is substantially of the same relative magnitude for all three colors.

In accordance with the invention, the optical system also includes a corrector for the common astigmatism. This corrector may be located at any desired point along the optical axis of the system between the objective lens 12 and the color selective apparatus 17. In other words, it may be placed at any point in a path which is traveled by light of all of the component image colors. In the presently described embodiment of the invention, the astigmatism corrector is in the form of a cylindrical lens 24 which may be most conveniently located between the objectvie lenses 15 and 16 of the image-relaying apparatus 14 and may be either a positive or negative lens. This will become clearer after a more detailed description of the manner in which the apparatus operates in accordance with the present invention.

Before considering in any greater detail some of the other features of this invention, a brief description now will be given of the operation of the apparatus shown in Figure 1. The objective lens 12 focuses the object O at a point O' in the field lens 13. The distance between the objective lens 12 and the field lens 13 is relatively small. The reason for this is that either the lens 12 itself and/or some of the other objective lenses with which it is interchangeably mounted in a standard television camera are required to have short focal lengths. In such a standard camera, the video signal-generating tube would be located so that the photo-sensitive electrode thereof would lie approximately in the plane of the field lens 13 so that the object O would be focused on such electrode by the objective lens.

The field lens 13 focuses the point A, which is effectively in the plane of the iris diaphragm of the lens 12, at a point A' lying approximately at the center of the image-relaying apparatus 14. This apparatus in turn reimages point O' so that, after the light is separated into its component colors, it is focused at points $O_R''$, $O_B''$ and $O_G''$ respectively on the red, blue and green video signal-generating tubes 19, 22 and 23.

It will be understood that the function of the image-relaying apparatus 14 is to effectively transfer the focal plane of the objective lens 12 to the respective signal generating tubes 19, 22 and 23. In view of the described components comprising the specific image-relaying apparatus 14 used in this embodiment of the invention, it is seen that the image is transferred at unit magnification. The speed of "f" number of the image-relaying apparatus will be substantially the same as that of either the lenses 15 or 16 alone when producing an image of a relatively distant object.

The field lens 13 is used in order to maintain the efficiency of the system at a maximum. By reason of its described location and its characteristics, it insures that substantially all of the light that the objective lens 12 transmits to produce the image at O' will be further directed into the image-relaying apparatus 14 without appreciable loss. Furthermore, the field lens 13 provides uniformity of illumination over the entire image field. If it were to be omitted from the system the produced image would be brighter in the center than elsewhere.

As previously described, the astigmatism corrector lens 24 may be located substantially at any point in the system between the object O and the color selective apparatus 17. For example, it may be located between the objective lens 12 and the field lens 13. Alternatively, it may be located between the field lens 13 and the image-relaying apparatus 14. Another possible location of the astigmatism corrector lens is between the image-relaying apparatus and the color selective device 17. It has been found, however, to be most conveniently located between the two lens systems 15 and 16 of the image relaying-apparatus 14. The magnifying power of the corrector lens will depend upon its location in the system.

Furthermore, the cylindrical corrector lens 24 may be either a positive or a negative lens. In the case of a positive corrector lens, it will be located so that its principal section, that is, its plane of maximum curvature, is parallel to the plane of the drawing. If a negative corrector lens is to be used, it will be so mounted that its principal section is at right angles to the plane of the drawing. As will be demonstrated hereinafter, it ordinarily is preferable to employ a negative astigmatism corrector lens for the reason that it helps to gain extra working distance between the image-relaying lens 16 and the camera tube 23 in which to mount the color selective device 17.

It will be appreciated that the over-all length of the optical system is determined principally by the space required to mount the color selective apparatus between the image-relaying apparatus 14 and the signal generating tubes. In the case of the embodiment of the invention shown in Figure 1, for example, the total length of the light path from the point A' to the photo-sensitive electrodes of the tubes 19, 22 and 23 is the same for all component colors. Consequently, for a particular color selective apparatus such as 17, a certain minimum distance is required between the lens array 16 and the point $O_G''$ for example. Accordingly, the lens array 16 of the image-relaying apparatus is selected so that it has a relatively high ratio of back working distance to focal length. Having selected the lens system 16 on this basis, the lens arrangement 15 is chosen to be identical, in the case where it is desired that the image-relaying apparatus have a unit magnification. Accordingly, the working distance between the points O' and A' will be substantially equal to the working distance between points A' and O''. The spacing between the objective lens 12 and the field lens 13 is determined by the focal length, or back working distance, of the lens 12. In the assumed case, the distance from the seat of the lens 12 to the point O' in the lens 13 is relatively short and ordinarily is of the magnitude of one to two inches, for example.

Reference now will be made to Figures 2 and 2*a* for a description of an illustrative embodiment of the invention, particularly with regard to typical mountings for the different components of the system. A mounting tube 25 is provided to support all of the components of the system except the short focal length objective lens 12. The field lens 13 is supported in an annular recess of a substantially cylindrical holder 26. This holder is adapted to fit snugly inside of the mounting tube 25 and may extend somewhat from the end of this tube substantially as shown. The holder 26 also may support, in another annular recess, an infra-red filter 27 and a field stop plate 28 having a rectangular aperture formed therein.

The mounting tube 25 also supports two similar mounting sleeves 29 and 30, which are substantially cylindrical in form. The mounting sleeves in turn provide supports respectively for the relatively long focal length objective lens systems 15 and 16 comprising the image-relaying apparatus 14 of Figure 1. There also is provided a mounting ring 31 for the astigmatism corrector lens 24. The ring 31 is designed to be mounted between the sleeves 29 and 30 in such a manner that it may be rotated about the axis of the system for alignment purposes. As shown more clearly in Figure 2*a*, the mounting tube 25 is provided with a transverse slot 32 in which to receive a screw 33 which is threaded into the mounting ring 31. Adjustable rotation of the ring 31 may be effected by means of this screw which also, if desired, may be of the type which can be tightened against the tube 25 in order to securely position the mounting ring in its adjusted position.

The end of the mounting tube 25, which is opposite to that in which the field lens holder 26 is mounted, is shaped to support the dichroic reflectors 18 and 21 of the color selective apparatus 17 of Figure 1. These reflectors are held in place against the appropriate flat surface of a mounting apparatus by means such as a plurality of screws 34 and suitable lugs extending over the edge of the reflectors. The mounting tube 25 also is provided with suitable openings adjacent to the dichroic reflectors 18 and 21 to permit the light emanating from the color selective apparatus to travel to the respective signal-generating tubes. These openings are indicated at 35, 36 and 37.

The general manner in which dichroic reflectors function to effect a selective color separation of polychromatic light is so well known to those skilled in the art that further description of this part of the optical system will be omitted. Further consideration will be given, however, to the manner in which the dichroic reflectors of the present system inherently produce astigmatism.

For this purpose, reference now will be made to Figure 3 of the drawings. In general, the astigmatism is produced by reason of the fact that the dichroic reflector includes a transparent plane parallel plate support which is mounted at an oblique angle to the axis of the optical system. It is necessary in a system of the character described, that the dichroic reflector be mounted at an oblique angle so as to suitably separate the paths of the segregated light from one another and also from the path of the polychromatic light.

In Figure 3, it is assumed that XX′ is the axis of an image-forming system in which a plane parallel transparent plate 38 is mounted so as to make an oblique angle with the axis. It will be understood that the parallel surfaces of the plate 38 are at right angles to the plane of the drawing. It is further assumed that a pencil of light rays traveling in the direction PA will converge to a point image at the point $t_0s_0$ in the absence of the plate 38. The line PA represents the principal ray of this pencil of rays and it is further assumed to lie close to the axis XX′ and substantially parallel to it. For the purpose of this discussion, two fans of rays of the pencil will be considered. The fan of rays lying in the plane of the drawing are the so-called tangential rays and, in the absence of the plate 38, converge at the point $t_0$. The fan of rays at right angles to the plane of the drawing are the so-called sagittal rays and converge at the point $s_0$ if the plate 38 is not present. In the case where the plate 38 is not in the light path, the initial object distance from the point A to the point $t_0s_0$ is $t_0=s_0$. This means that there is no astigmatism in the image formed by such a system.

When the plate 38 is inserted in the light path substantially as shown, however, the path of the principal ray is PABR. The portions of this path which are in air are PA and BR and it is seen that they are substantially parallel to one another and to the axis XX′. By reason of the fact that the plate 38 has a higher index of refraction than that of the surrounding air, the path of the ray which, at the entrance point A, makes an angle I with the normal to the plate 38 is refracted in a well-known manner to form the angle I′ with the normal. A similar refraction of the light ray at the point B of emergence from the plate 38 is effected. Consequently, in the plate, the principal ray travels a distance AB equal to D/cos I′ where D is the thickness of the plate. In such a situation, the tangential fan of rays converge to form an image at point $t_2'$. Also, the fan of sagittal rays converge at a point $s_2'$. These distances are measured from the emergence point B.

As a result of the formation of images by the tangential and sagittal rays at two different points, the image formed by such a system is said to be astigmatic. For example, assume that the original image, which would be formed at point $t_0s_0$ in the absence of the plate 38, is a cross in a plane at right angles to the axis XX′ having one of its arms in the plane of the drawing and the other arm substantially at right angles to the plane of the drawing. With the plate 38 in place, the arm of the cross which is at right angles to the plane of the drawing will be imaged at the point $t_2'$. The other arm of the cross will be imaged at the point $s_2'$. In general, it is seen that the focal point of the tangential rays is displaced farther in the direction of the light than the focal point of the sagittal rays.

It has been determined that the astigmatism which may be produced by a plane transparent plate mounted at an oblique angle to the axis of the optical system will produce astigmatism $=(t_2'-s_2')$ of a magnitude equal substantially to 27% of the thickness of the plate when the oblique angle is substantially 45°. This amount of astigmatism is too much to be overlooked in a system of the character required for color television purposes. In accordance with the previously described embodiment of the invention where two of such plates are introduced in the light path and each one of them is approximately two inches square and effectively two millimeters thick, the astigmatism produced thereby amounts to a little more than one millimeter. This effect will be proportionately greater for larger and thicker plates and is seriously detrimental to image quality at optical speeds of f/3.5 or faster. Optical systems of such speeds are required in color television systems. Accordingly, it is imperative that such antigmatism be corrected.

The correction of the astigmatism which is introduced in the manner described may be divided into two steps. It is first necessary to make the astigmatism exactly the same for all three of the component color images. There still remains, however, a considerable amount of astigmatism which is common to all three of the color images. It, therefore, is necessary secondly to correct or compensate for this common astigmatism.

The first part of the astigmatism correction is effected by means of a dichroic reflector arrangement in accordance with the teachings of the copending Albright application previously referred to. Briefly, this consists of designing the dichroic reflectors so that the paths of the differently colored lights through them are substantially equalized in length. For example, in the form of the dichroic reflector system shown in Figure 1, a red light reflective film 39 is placed on the face of the supporting plate 41 which is remote from the object O. Similarly, in the type of dichroic reflector indicated at 21, the blue reflective film 42 is placed between a pair of supporting plates 43 and 44. The thickness of each of these plates is substantially one-half of the thickness of the plate 41.

It is seen that the red light is required to make two traverses of the full thickness of plate 41. The blue and green light, on the other hand, travels once through the plate 41. The blue light then travels twice through the half thickness plate 43. Also, the green light travels once through each of the half thickness plates 43 and 44. Consequently, both the green and the blue light travel a total distance through the higher refractive material of the plates 41, 43 and 44, which is substantially equal to the distance traveled by the red light in plate 41. By such an arrangement the astigmatism is made equal or normalized for light of all three colors in the color selective apparatus 17.

The second part of the correction for the astigmatism which is produced by reason of the oblique angles at which the dichroic reflectors are mounted in the system is accomplished by effecting a compensating astigmatism in the system. This may be done in any one of several ways. One way in which the astigmatism correction may be effected is by means of a cylindrical lens which may be placed at any desired point between the object O and the color selective apparatus 17. In Figure 1, as described, a cylindrical lens 24 is introduced in the system at a point between the objective lens system 15 and 16 constituting the image-relaying apparatus 14.

Another way of correcting the astigmatism consists in mounting a structure similar to the dichroic reflector arrangement between the object O and the image-relaying apparatus 14. Such an arrangement is shown in Figures 4 and 4*a* to which reference now will be made. The optical system in accordance with this embodiment of the invention includes a relatively short focal length objective lens 12, a field lens 13, image-relaying apparatus 14 and a color selective apparatus 17*a*. In this case, the color selective apparatus is in the form of a pair of crossed dichroic reflectors 45 and 46. Each of these reflectors is similar in character to the dichroic reflector 21 of the color selective apparatus 17 shown in Figure 1. In the present case, the reflector 45 reflects red light upwardly onto a mirror or other non-color selective image reflector 47 and from there to a red video signal-producing tube 48. In a similar manner, the reflector 46 directs blue light downwardly onto a reflector 49 and thence to a blue video signal-generating tube 51. The reflector 45 transmits both blue and green light. The reflector 46 transmits both red and green light. Consequently, the green light is not reflected by either of the dichroic devices 45 and 46 and travels directly through the color selective apparatus 17*a* to a green video signal-generating tube 52.

In this form of the invention, the video signal generating tubes 48, 51 and 52 are assumed to be the well-known image orthicons which are considerably larger than the vidicon type of tubes used in the apparatus of Figure 1. It consequently is desirable to locate the red and blue tubes more in parallel positions to the green tube than to permit them to extend at right angles from the sides of the camera as in the other embodiment of the invention. Therefore, the optical system includes the reflectors 47 and 49 so as to permit the desired mounting of the red and blue tubes.

In this case, the astigmatism corrector 53 is in the form of a pair of plane parallel plates 54 and 55. Preferably, these plates are of substantially the same thickness as the dichroic reflectors 45 and 46. Also, they should be mounted at substantially the same oblique angles to the axis of the system that the dichroic reflectors are mounted. By this means, it is seen that astigmatism is produced by the corrector 53 in an amount substantially equal to that produced by the color selective apparatus 17*a*. In order to compensate or correct for the astigmatism produced by the color selective apparatus, however, the plates 54 and 55 of the corrector 53 are mounted in positions which are rotated about the axis of the system substantially 90° relative to the color selective apparatus. It is seen that the astigmatism produced by the corrector 53 is in a sense which is opposite to that produced by the color selective apparatus 17*a*. The over-all effect of the two astigmatisms of the image produced by the color selective apparatus and the corrector 53 is an image without astigmatism.

From the foregoing description of typical embodiments of the invention it is seen that there is provided an improved color television camera. By means of this invention a maximum use is made of the optical apparatus comprising standard black and white television camera equipment. Furthermore, the invention enables the use of color-selecting apparatus such as dichroic reflectors without concomitantly producing appreciable astigmatism.

It will be understood that apparatus in accordance with the present invention, like most optical systems, is capable of operating in both directions. Accordingly, it is evident that this invention may be used with substantially equal facility in a color television image-reproducing system. In such an embodiment the kinescopes will be substituted for the camera tube shown herein.

It also will be appreciated that the principles underlying the present invention are such that the invention may be embodied in systems other than color television systems and also in somewhat different forms than those comprising the illustrative embodiments described herein. In the case of the embodiment of the invention in an optical system in which the light is to be separated into its different component colors, it will be appreciated that the color-selective apparatus need not necessarily be specifically the dichroic type of reflector shown herein. For example, the light first may be separated into different components and directed along different paths by means of light reflectors which are not color selective. The color selection of the separated light may then be effected by means such as filters. In such a system the light separating reflectors may be of such a character as to introduce astigmatism in the system much in the manner described herein in connection with the dichroic type of reflectors. In such a case, it may be equally desirable to correct for the astigmatism as in the embodiments described specifically herein.

It also may be appreciated that the type of optical system embodying the present invention in which an astigmatic correction is to be effected substantially in the manner described need not be one in which the light is to be separated into a plurality of component colors. So long as the light separating apparatus is of the same general character as that described, in which a plane transparent member is located at an oblique angle to the axis of the optical system, some astigmatism will be introduced. Accordingly, such systems are considered to come within the true scope of the invention.

Furthermore, it will be apparent that another embodiment of the invention is in apparatus where it is desired to locate light separating apparatus, which may be color selective or otherwise, between an object plane and a plurality of different image planes. In this case, it may be considered unnecessary to provide astigmatism correction. Hence, such a system may comprise essentially that sub-combination of the present invention which includes the image relaying apparatus located between the object plane and the light separating apparatus.

In view of the described nature and fields of use of the invention its scope is set out in the appended claims.

What is claimed is:

1. An optical system for a color television camera having a video signal-producing tube for each of a plurality of component colors of an object comprising, a relatively short focal length objective lens located between said object and the reign of said tubes, color-selective apparatus including a dichroic reflector located between said objective lens and said tubes, said dichroic reflector being mounted at an oblique angle to the light path from said objective lens and comprising two equal thickness transparent plates supporting between them a color-selective reflecting film, thereby being of such a character that the astigmatism produced thereby is equalized for both the transmitted and reflected light, image relaying apparatus comprising two similar lens systems located in said light path between said objective and said color-selective apparatus and operating to effectively transfer the focal plane of said objective lens to said signal-producing tubes, a field lens located adjacent to said objective lens in said light path between said objective lens and said image relaying apparatus and operating to direct without appreciable loss substantially all of the light transmitted by said objective lens to said image relaying apparatus, and an astigmatism corrector comprising a plate similar in overall structure and characteristics to said dichroic reflector supporting plates and being located in said light path between said objective lens and said color-selective apparatus, said corrector plate being mounted at substantially the same oblique angle as said dichroic reflector but axially rotated 90° relative to said dichroic reflector.

2. An optical system for a color television camera as defined in claim 1 wherein, said astigmatism corrector is located between said field lens and said color-selective apparatus.

3. An optical system for a color television camera as defined in claim 1 wherein, said astigmatism corrector is located between said field lens and said image relaying apparatus.

4. An optical system for a color television camera having a video signal-producing tube for each of three component colors of an object comprising, a relatively short focal length objective lens located in the light path from said object to said tubes, color-selective apparatus including a pair of dichroic reflectors located in the light paths between said objective lens and said respective tubes, said dichroic reflectors being mounted respectively at oblique angles to the light path from said objective lens, each of said dichroic reflectors comprising a plane transparent support for a color-selective reflecting film and being of such a character that the astigmatism produced thereby is equalized for the transmitted and reflected light of the different component colors, the support of at least one of said dichroic reflectors consisting of two equal thickness plates on opposite sides of the film supported thereby, image relaying apparatus comprising two relatively long focal length substantially similar lens systems located in said light path between said objective lens and said color-selective apparatus to effectively transfer the image produced in the focal plane of said objective lens to said signal-producing tubes, each of the two lens systems of said image relaying apparatus being mounted on the normally infinity conjugate side of the other whereby to produce a unit over-all magnification, a field lens located adjacent to said objective lens in the light path between said objective lens and said image relaying apparatus to efficiently transfer light from said objective lens to said image relaying apparatus, and an astigmatism corrector comprising a pair of transparent plates similar in structure and characteristics to said dichroic reflector supports and being located in the light path between said objective lens and said color-selective apparatus, said corrector plates being mounted respectively at substantially the same oblique angles as said dichroic reflectors but rotated axially 90° relative to said dichroic reflectors.

5. An optical system for a color television camera as defined in claim 4 wherein, said astigmatism corrector plates are located between said field lens and said image relaying apparatus.

6. An optical system for a television camera having a video signal-producing tube for each of three component colors of an object comprising, a relatively short focal length objective lens located in the light path from said object to said tubes, color-selective apparatus including a pair of dichroic reflectors located in the light paths between said objective lens and said respective tubes, a first one of said dichroic reflectors comprising two plane transparent supports each of predetermined thickness and a film mounted between said two supports of a character to reflect light of a first predetermined color, said first dichroic reflector being mounted substantially at a 45° angle to the light path from said objective lens in such a manner to reflect upwardly light of said first predetermined color, the second one of said dichroic reflectors comprising two plane transparent supports each of said predetermined thickness and a film mounted between said two supports of a character to reflect light of a second predetermined color, said second dichroic reflector also being mounted at a substantially 45° angle to the light path from said objective lens and intersecting said first dichroic reflector substantially at the central axis of said light path in such a manner to reflect downwardly light of said second predetermined color, both of said dichroic reflectors being of such a character that light of a third predetermined color is transmitted through them substantially in a straight path from said objective lens, image relaying apparatus comprising two relatively long focal length substantially similar objective lens systems located in said light path between said objective lens and said color selective apparatus to effectively transfer the image produced in the focal plane of said objective lens to said signal-producing tubes, each of the two lens systems of said image relaying apparatus being mounted on the normally infinity conjugate side of the other, a field lens mounted adjacent to said short focal length objective lens in the light path between said short focal length objective lens and said image relaying apparatus to efficiently transfer light from said objective lens to said image relaying apparatus, and a pair of transparent plates each of twice said predetermined thickness and located in said light path between said objective lens and said image relaying apparatus, said plates being mounted respectively at 45° angles to said light path but rotated axially 90° relative to said dichroic reflectors, whereby to correct the astigmatism produced in light of all of said component colors by said color selective apparatus.

LAWRENCE T. SACHTLEBEN.
GLENN L. DIMMICK.

References Cited in the file of this patent

UNITED STATES PATENTS

| Number | Name | Date |
|---|---|---|
| 1,238,775 | Ives | Sept. 4, 1917 |
| 1,629,974 | Russo | May 24, 1927 |
| 1,873,302 | Francisco | Aug. 23, 1932 |
| 1,989,317 | Harper | Jan. 29, 1935 |
| 2,405,063 | Sisson | July 30, 1946 |

FOREIGN PATENTS

| Number | Country | Date |
|---|---|---|
| 13,666 | Great Britain | July 1, 1899 |
| 25,908 | Great Britain | Nov. 16, 1906 |
| 380,938 | Great Britain | Sept. 29, 1932 |
| 385,141 | Great Britain | Dec. 22, 1932 |
| 500,728 | Great Britain | Feb. 14, 1939 |
| 266,144 | Switzerland | Apr. 17, 1950 |

OTHER REFERENCES

Abstract Publication, 41,555, published Dec. 6, 1949.